US005557832A

United States Patent [19]

Vanden Brook

[11] Patent Number: 5,557,832
[45] Date of Patent: Sep. 24, 1996

[54] TOOL FOR ATTACHING AND REMOVING CLIP TYPE FASTENER MEMBERS AND THE LIKE

[76] Inventor: Gerald A. Vanden Brook, 1401 Koerber, Cape Girardeau, Mo. 63701

[21] Appl. No.: 306,664

[22] Filed: Sep. 15, 1994

[51] Int. Cl.$^6$ .......... B23F 19/04

[52] U.S. Cl. .......... 29/243.56; 29/229; 29/278; 29/270

[58] Field of Search .......... 81/901, 53.11, 81/44, 13; 29/229, 235, 243.56, 278, 270; 7/166, 170

[56] References Cited

U.S. PATENT DOCUMENTS

| | | | |
|---|---|---|---|
| 301,140 | 7/1884 | Myers | 81/44 |
| 971,672 | 10/1910 | Gibson et al. . | |
| 985,087 | 2/1911 | Wilson | 81/901 |
| 1,119,807 | 12/1914 | Carter | 81/44 |
| 1,213,334 | 1/1917 | Chapman | 81/44 |
| 1,357,012 | 10/1920 | Tweto . | |
| 1,417,868 | 5/1922 | Tanner . | |
| 2,403,666 | 7/1946 | Lubetsky . | |
| 2,789,287 | 4/1957 | Lambert | 81/44 |
| 2,796,661 | 6/1957 | Tuttle . | |
| 4,277,872 | 7/1981 | Lewis . | |
| 4,520,997 | 6/1985 | Lorton | 254/26 R |
| 4,942,655 | 7/1990 | Buzzelli . | |
| 5,301,407 | 4/1994 | Koenig | 29/229 |

*Primary Examiner*—Robert C. Watson
*Attorney, Agent, or Firm*—Haverstock, Garrett & Roberts

[57] ABSTRACT

A tool member to aid in the attachment and removal of a wide variety of differently sized and shaped clip type fastener members commonly used in a wide variety of different mechanical assemblies such as in the installation and removal of the ball device associated with many different types of trailer hitch assemblies, the present tool member comprising a body portion having opposed end portions, one end portion of the tool body including a hook member for engaging the clip type fastener member to effect removal thereof by exerting a pulling force thereagainst, and the opposite end portion of the tool body including a recessed cavity for receiving and holding the clip type fastener member when positioned therewithin to effect attachment thereof to a particular mechanical assembly by exerting a pushing force thereagainst. The cavity end portion of the present tool member is likewise adaptable for receiving and holding a plurality of different adapter/insert members, each adapter member including a recessed cavity for receiving and holding a different range of differently sized and/or shaped clip type fastener members. The present tool member has utility in conjunction with a wide variety of different mechanical assemblies and can be made in a variety of different shapes and sizes so long as push-pull forces can be easily transferred from the tool member to the particular clip type fastener member or other fastener member involved.

9 Claims, 3 Drawing Sheets

TOOL FOR ATTACHING AND REMOVING CLIP TYPE FASTENER MEMBERS AND THE LIKE

The present invention relates to a device for removing and attaching clip type fastener members commonly used in association with trailer hitches and other devices and, more particularly, to a tool device specifically designed to aid in both the attachment and removal of a wide variety of differently sized and shaped safety clip members commonly used in the installation and removal of the ball member associated with many different types of trailer hitch assemblies as well as other devices utilizing similar clip members.

BACKGROUND OF THE INVENTION

Many trailer hitch devices or other towing assemblies are designed such that the ball portion of the hitch assembly can be easily attached to a vehicle when towing is required and, similarly, can be easily removed from the vehicle when towing is not required. This is generally accomplished through the use of a telescoping arrangement whereby the ball assembly is attached to a tubular bar member which is slidably receivable within a corresponding tubular member which is permanently mounted to the vehicle. The telescoping tubular bar members are held and locked in proper position relative to each other by inserting a pin member through a plurality of aligned openings in the respective telescoping bar members and thereafter engaging a safety clip type member with a groove or other means associated with one end portion of the pin member. Because of the particular size of some of the safety clip type members utilized on the bigger hitch assemblies such as those used on large truck vehicles as well as on many farm implements, inserting and removing such safety clip members onto and off of the pin member or other associated device can become extremely difficult as well as particularly hard on a person's hand if no tool is used to accomplish these tasks. Also, importantly, often times these safety clip members are located in such an awkward position that their location likewise increases the difficulty in attaching and removing the same as well as contributing greatly to additional wear and tear on a person's hand. The present tool device is specifically designed to facilitate easy removal and attachment of these safety clip members without wear and tear on a person's hand.

The present tool member can be used in a multitude of different applications and can be made in a variety of different shapes and sizes so long as push-pull forces can be easily transferred from the tool member to the particular safety clip member involved. For example, the particular type of pin and safety clip arrangement described above is utilized on a wide variety of devices such as lawn tractors and a host of farm tractors and implements where attachments or other portions of a particular mechanical device are designed for quick and easy attachment to and removal from the main device. More particularly, the grass bag assembly as well as the grass chute arrangement associated with many lawn tractors utilize such a pin and safety clip arrangement for both attaching and removing particular structural components associated with these assemblies such as some of the components for holding the bag(s) and/or chute in proper operative position on a particular lawn tractor. These safety clip members are likewise commonly used on a wide variety of different mechanical installations, whether in conjunction with the particular pin and groove construction described above or some other mechanical arrangement to hold various parts of various devices in proper position on such devices.

Various fastener installing and removing tools have been constructed and used in the past for analogous purposes. Typical of such devices are the devices disclosed in U.S. Pat. Nos. 971,672; 1,357,012; 1,417,868; 2,403,666; 2,796,661; 4,277,872; and 4,942,655. Although all of the prior art devices referenced above disclose a wide variety of different means at one end portion thereof for holding, retaining and/or removing a fastener member such as the use of magnetic means, push-pull articulated arm constructions, parallel blade/slot arrangements, means for engaging a tool bit holder, and a variety of plier-type constructions, these prior art constructions suffer from many deficiencies in that they are structurally overly complex, expensive to manufacture, difficult and cumbersome to handle and use, difficult and cumbersome to repair, and many of such prior art devices include a large number of parts and/or components, which multiplicity of parts again greatly hinders quick and easy use and repair of such devices. Such multiplicity of parts and/or components also greatly increases the risks of tool breakage and/or malfunction. None of the known prior art devices are as simple structurally as the present construction and none disclose the same particular constructional features associated with the present tool such as a recessed cavity for easily and quickly receiving and frictionally holding a clip/fastener member in proper position for installation purposes, and a hook member for engaging and more simply facilitating the removal of a particular clip/fastener member. For these and other reasons, the known prior art constructions have not been entirely satisfactory and have enjoyed limited usefulness.

SUMMARY OF THE INVENTION

The present tool device overcomes many of the disadvantages and shortcomings associated with the known constructions and teaches the construction and operation of several embodiments of a tool which is simple and easy to use and manipulate, and is relatively inexpensive to make, repair and/or replace. The present tool includes a body portion which is preferably molded or shaped so as to be easy and comfortable to grip by a person using the device, keeping in mind that both opposite ends of the present tool will be used as will be hereinafter explained. The present tool member includes a hook member or other means located at one end portion of the device for engaging the arcuate end portion of a particular safety clip or other fastener. When so engaged, a user can easily apply a pulling force to the tool to remove the safety clip or other fastener from the groove portion of the pin member without any undue wear and tear on a person's hand. Similarly, the safety clip or other fastener member can be easily installed on a particular pin member by inserting the arcuate end portion of such member into the recessed cavity located at the opposite end portion of the present tool. The present cavity is sufficiently deep so that a clip/fastener member can be easily inserted and held therewithin while the opposite end portion of the clip/fastener member is positioned and exposed for engagement with the groove associated with the pin member. When so positioned, a person can easily insert and engage the clip/fastener member with the groove on a particular pin member by applying a pushing force to the tool thereby moving the clip/fastener member into operative engagement with such groove.

The present tool member can also be used in conjunction with a wide variety of differently sized and shaped clip/ fastener members. In this regard, the present hook member must be sized and shaped so as to be engageable with the arcuate end portion of a wide plurality of differently dimensioned clip/fastener members and the recessed cavity associated with the opposite end portion thereof must likewise be structured for receiving and holding a range of differently shaped and/or dimensioned clip/fastener members. It is also anticipated that the cavity end portion of the present tool may likewise be adaptable for receiving and holding a plurality of different adapter/insert members, each adapter member including a recessed cavity for receiving and holding a different range of differently sized and/or shaped clip/fastener members. It is still further recognized that the body portion of the present tool may also include grip means or other means for facilitating the gripping and holding of the present tool member by a user.

It is therefore a principle object of the present invention to teach the construction and operation of a tool for both removing and attaching a wide variety of differently sized and shaped safety clip members as well as other fastener members.

Another object is to teach the construction and operation of a tool which is structurally and operationally easily and comfortable to grasp, use and manipulate for its intended purpose.

Another object is to provide a tool which includes adjustable means for accommodating a wide variety of differently sized and shaped safety clip members as well as other fastener members.

Another object is to provide a tool for holding and attaching fastener members on a variety of different mechanical assemblies wherein one end portion of the tool includes a recessed cavity of sufficient depth to hold and retain a range of differently shaped and/or differently dimensioned safety clip members while the opposite end portions of such clip members can be easily manipulated and positioned for engagement with the particular assemblies to which they are being attached.

Another object is to teach the construction and operation of a tool for attaching clip/fastener members wherein one end portion of the tool is adaptable for receiving any one of a plurality of adapter or insert members, each adapter/insert member including means for holding and receiving a different range of differently sized clip/fastener members.

Another object is to provide a tool for removing clip/fastener members having a hook member associated with one end portion thereof, the hook member being sized and shaped so as to be engageable with the arcuate end portion of a wide variety of differently dimensioned clip/fastener members.

Another object is to provide an improved tool for installing and removing clip type fastener members and the like which can be economically produced.

These and other objects and advantages of the present invention will become apparent to those skilled in the art after considering the following detailed specification in conjunction with the accompanying drawings.

DETAILED DESCRIPTION OF THE PREFERRED EMBODIMENT

Figure 1:
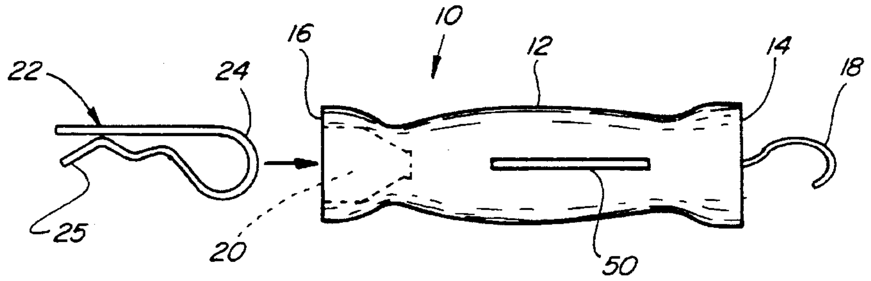
FIG. 1 is a side elevational view of a preferred embodiment of the present tool member constructed according to teachings of the present invention showing a typical clip type fastener member positioned for engagement with one end portion of the tool.
Figure 2:
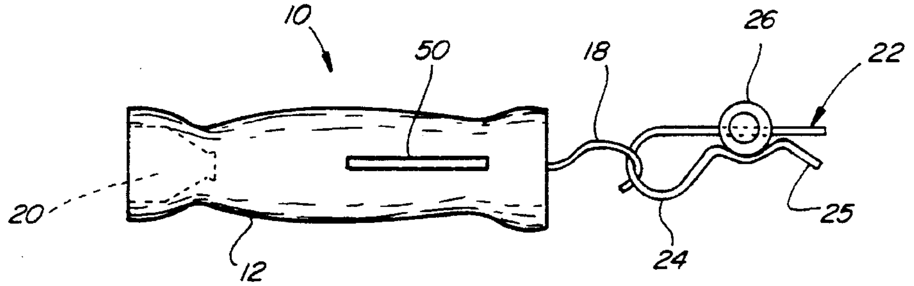
FIG. 2 is a side elevational view of the tool member of FIG. 1 showing the hook member associated therewith engaged with a clip type fastener member for removing the same from a typical grooved pin member.
Figure 3:
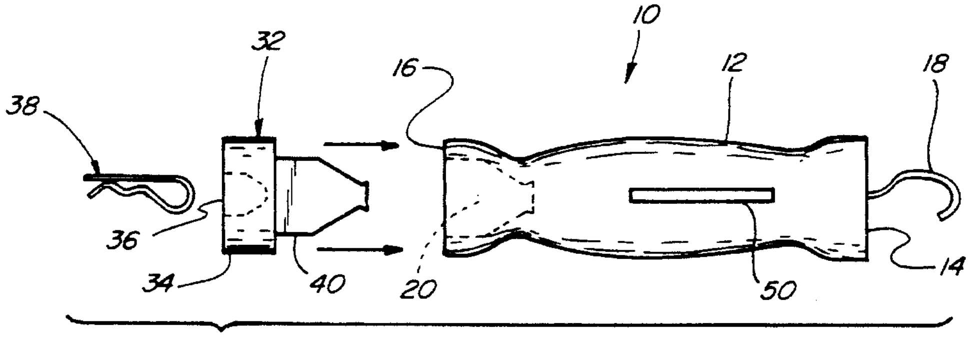
FIG. 3 is an exploded side elevational view of the present tool member substantially similar to FIG. 1 showing the present adapter/insert member positioned for cooperative engagement with the recessed cavity associated with one end portion of the tool.

Referring to the drawings more particularly by reference numbers wherein like numerals refer to like parts, number 10 in FIGS. 1, 2 and 3 identifies a tool for attaching and removing clip type fasteners and the like constructed according to the teachings of the present invention. The tool 10 includes a body portion 12 which is shaped and sized to be easily and comfortably grasped by a user's hand, keeping in mind that both opposite ends of the tool 10 will be used to effect either installation or removal of a particular clip type fastener such as the clip member 22 illustrated in FIGS. 1 and 2. To this end, the contour of the tool body portion 12 should facilitate a comfortable grip regardless of which tool end is being utilized. This contoured shape may include the somewhat curved but symmetrical shape illustrated in FIGS. 1, 2 and 3, although other contoured shapes will likewise provide the desired degree of comfortability.

The tool body portion 12 includes opposed end portions 14 and 16, the tool end portion 14 having the removal means 18 associated therewith whereas the tool end portion 16 has the attachment means 20 associated therewith. More specifically, the tool removal means 18 includes a hook member (FIGS. 1–3) which is sized and shaped so as to be engageable with the arcuate end portion of a wide plurality of differently dimensioned clip type fastener members. As illustrated in FIG. 2, the hook member 18 can be easily inserted within the loop portion of the clip member 22 formed by the arcuate portion 24 so as to effect a pulling force on the clip member 22 to remove the same from the pin member 26 to which it is engaged. This can be easily accomplished without any undue wear and tear on a user's hand. Although the present tool 10 is specifically designed to both attach and remove clip type members similar to the clip member 22 illustrated in FIGS. 1–3 and 7, it is also recognized and anticipated that the hook member 18 can take on a wide variety of other shapes compatible with engaging and effecting the removal of a wide variety of other fasteners including differently shaped clip members as well as other types of fasteners such as E-clip fasteners, cotter pins, spring type clip members and those different types of clip/fasteners disclosed in U.S. Pat. Nos. 971,672; 1,357,012; 1,417,868; 2,403,666; 2,796,661; 4,277,872; and 4,942,655 to name a few.

Figure 7:
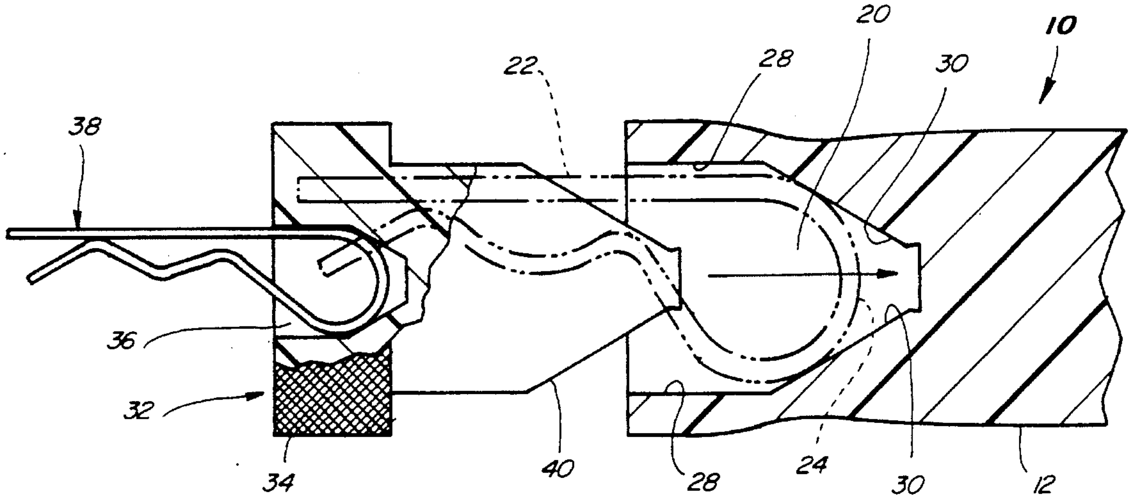
FIG. 7 is a fragmentary exploded and enlarged side cross-sectional view of the present tool showing a larger clip type fastener member in dotted outline form frictionally engaged with the recessed cavity associated with one end portion of the tool, and further showing the present adapter/insert member positioned for engagement with the recessed tool cavity, the adapter/insert member having a smaller clip type fastener member frictionally engaged with the recessed cavity associated respectively therewith.
Figure 8:
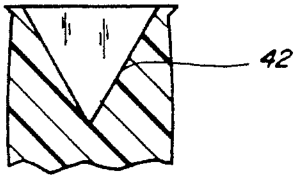
FIGS. 8–11 are cross-sectional views showing still other cavity configurations which may be utilized with both the present tool member and the adapter/insert member.
Figure 9:
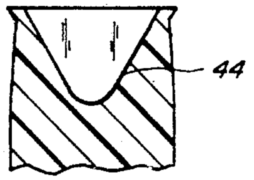
Figure 11:
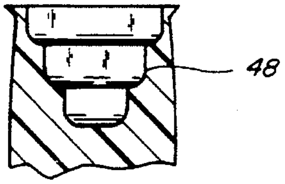
Figure 10:
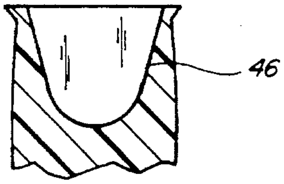

The attachment means 20 associated with the tool end portion 16 includes a recessed cavity as illustrated in FIGS. 1–3 and 7. The cavity 20 is sized and shaped such that the arcuate end portion 24 of the clip member 22 is frictionally held in a stable and secure position when inserted therewithin as best illustrated in FIG. 7. In this regard, as best shown in FIG. 7, the cavity side walls include substantially straight portions 28 and substantially V-shaped portions 30, the V-shaped side wall portions 30 engaging the arcuate end portion 24 of the clip member 22 as the clip member is progressively inserted therewithin. With respect to the V-shaped side wall portions 30, it is important to note that the angular orientation of such side walls 30 can be varied from tool to tool so as to achieve the desired degree of holdability necessary for attaching any particularly sized clip member 22 to a corresponding pin member 26 or other similar device. Also, importantly, the length or depth of the substantially straight, parallel cavity side walls 28 can likewise be varied from tool to tool, such side wall lengths determining what portion of a particular clip member will be received into the cavity 20 before the arcuate end portion associated therewith engages the V-shaped cavity side walls 30. It is therefore important that the length/depth and angular orientation of the cavity side walls 28 and 30 be selected such that a sufficient portion of the clip member 22 will be insertably received and engaged therewithin so as to not only adequately hold the clip member in a substantially straight, secure and stable position so that push forces can be easily transferred from the tool member 10 to the particular clip member or other fastener 22 to effect installation, but also such that a sufficient portion of the opposite end portion 25 of such clip member 22 will extend beyond the recessed cavity 20 so as to be in a suitable position to effect attachment to the grooved pin member 26 or other member during installation.

It is also preferred that the cavity 20 be sized and shaped so as to adequately hold the most commonly used clip members. Once the cavity 20 is so sized and shaped for a particular clip member 22, the V-shaped cavity side walls 30 will enable clip members somewhat larger and somewhat smaller than the preselected clip configuration to likewise be adequately held within the cavity 20. As a result, the particular configuration of the present recessed cavity 20 will receive and hold a range of differently sized clip/fastener members, the particular range of clip member sizes being determined by the overall size of such cavity and the particular length and angular orientation associated with the cavity side walls 28 and 30.

Figure 4:
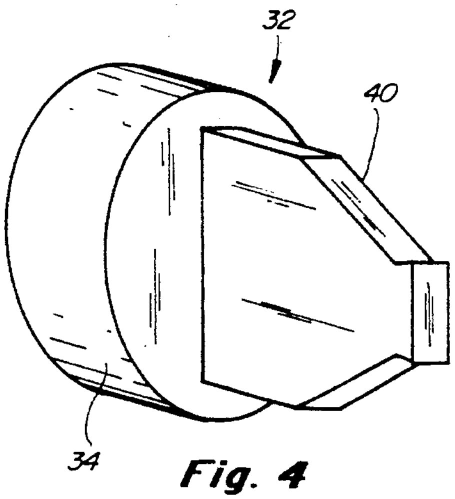
FIG. 4 is a perspective view of the present adapter/insert member.
Figure 5:
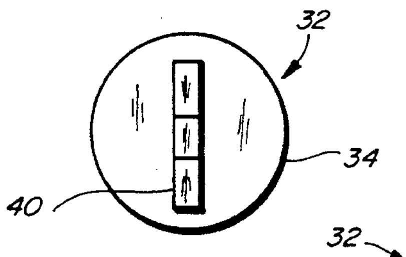
FIG. 5 is a right end view of the adapter/insert member illustrated in FIGS. 3 and 4.
Figure 6:
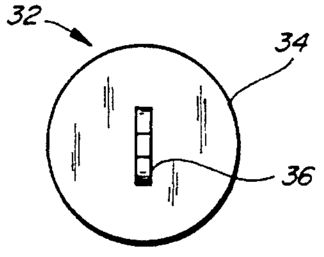
FIG. 6 is a left end view of the adapter/insert member illustrated in FIGS. 3 and 4.

In order to accommodate an even greater range of differently sized and shaped clip/fastener members, an adapter/insert member 32 may be utilized in conjunction with the present tool member 10. The adapter member 32 is designed to be insertably receivable within the tool cavity 20 and includes a cylindrical portion 34 which likewise includes a recessed cavity 36 as best shown in FIGS. 4–6. The recessed cavity 36 is sized and shaped substantially similar to the cavity 20 and is specifically designed to insertably receive and securely hold a differently sized clip member as compared to the clip member 22 such as the clip member 38 illustrated in FIGS. 3 and 7. In the particular adapter construction illustrated in FIGS. 3 and 7, the clip member 38 is shown as being somewhat smaller in overall size and shape as compared to the clip member 22. In this regard, it is recognized that the particular range of clip member sizes engageable with the adapter cavity 36 can be selected to be either greater or smaller than the particular range of clip member sizes engageable with the tool cavity 20 depending upon the overall size of the adapter cavity 36 so selected. In other words, the adapter cavity 36 can be designed to be either greater or smaller than the tool cavity 20 to meet the particular needs and different applications of the user. In this regard, it is anticipated that a plurality of adapter members 32 can be provided with any tool member 10 similar to the plurality of sockets provided with a conventional wrench and socket set so that the present tool member will be usable to both attach and remove a wide variety of differently sized clip/fastener members. This will allow the present tool member 10 to be used with a wider variety of fasteners than would be possible if only the single tool cavity 20 were utilized.

Also, importantly, the adapter/insert member 32 includes a tab portion 40 which preferably is integrally formed adjacent one side of the cylindrical portion 34 as best shown in FIGS. 3 and 4, the tab portion 40 extending in a direction opposite the adapter cavity 36. The adapter tab portion 40 is specifically shaped and dimensioned so as to be insertably receivable within the tool cavity 20, the particular tab configuration illustrated in FIGS. 4 and 7 conforming substantially to the shape of the tool cavity 20 and allowing the tab portion 40 to snap-lock or otherwise securely engage the cavity 20 when inserted therewithin. It is recognized that other tab configurations may likewise be utilized to achieve the stated objectives. Use of the adapter/insert member 32 greatly expands the range of differently sized clip/fastener members which can be operatively held by the tool 10. As clearly shown in FIG. 7, the adapter 32 is sized and shaped to securely hold the smaller clip member 38 much more effectively as compared to trying to engage the smaller clip member 38 with the larger tool cavity 22. As previously stated, it is contemplated and anticipated that a variety of adapter/insert members 32 may be developed and used to facilitate the attachment of any type of clip/fastener member for which a pushing force is required for installation.

Figure 12:
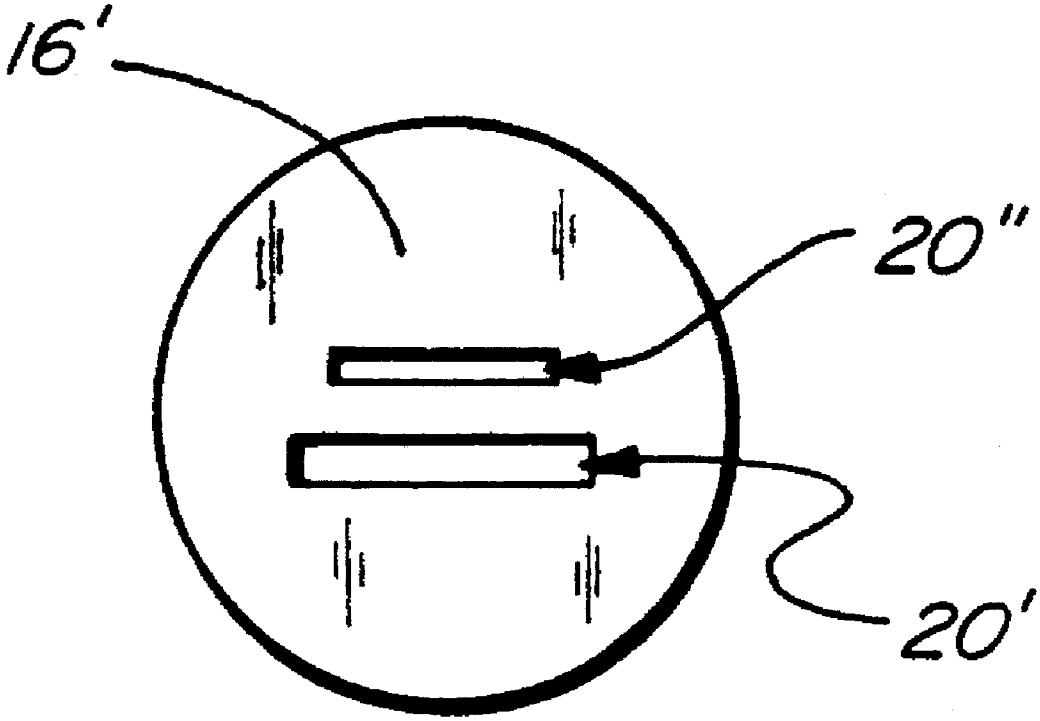
FIG. 12 is an end view of an alternate embodiment of the tool cavity end portion illustrating use of multiple recessed cavities for receiving and holding differently dimensioned clip type fastener members.

It is also important to recognize that the particular shape and overall configuration of the cavities 20 and 36 are subject to wide variations and may be conveniently fashioned into a variety of sizes and shapes, for example, a triangular, rectangular, square, hexagonal, circular or other overall configuration, without impairing the teachings and practice of the present construction so long as such cavities are capable of adequately holding clip type fastener members in a substantially straight, secure and stable position for operative engagement to the particular grooved pin member or other member to which they are attached. Similarly, the V-shaped side wall arrangement associated with cavities 20 and 36 may likewise be configured similar to the cavities 42 and 44 illustrated in FIGS. 8 and 9, or such cavity shapes may take on a more U-shape similar to the cavity 46 illustrated in FIG. 10, or such recessed cavities may be configured in a stair-step arrangement similar to the cavity 48 illustrated in FIG. 11, or the recessed cavities 20 and 36 may take on still some other shapes not illustrated herein which will likewise sufficiently engage and hold differently sized clip type fastener members. Importantly, the side walls associated with each of the above-referenced different cavity arrangements as shown in FIGS. 8–11 would likewise frictionally engage the head or arcuate end portion of a particular clip type fastener member at a different location along its depth depending upon the particular size and shape of the fastener member inserted therewithin. It is also recognized that the tool cavity end portion 16 may be made sufficiently large so as to include a plurality of recessed cavities, each such cavity being adaptable for receiving and holding a range of differently dimensioned clip type fasteners members. In this regard, FIG. 12 illustrates one possible configuration of the tool cavity end portion 16' for housing a plurality of recessed cavities 20 such as the pair of cavities 20' and 20". This configuration could also be used to house a plurality of cavities 36 in the adapter member 32. An advantage to placing multiple cavities 20 in the tool end portion 16 or in the adapter member 32 is that it allows the user to manipulate differently sized fasteners 22 with the same tool, and/or without changing adapter members. Still further, as shown in FIGS. 1–3, the tool body portion 12 may also include an elongated slot 50 adaptable for threadedly receiving a strap member (not shown) therethrough, which strap member would allow a user to securely fasten or affix the present tool member 10 to a portion of the hitch assembly in a convenient location for ready use when needed.

Although it is recognized that various acceptable materials of construction are available and could equally be employed to fabricate the various components of the present tool and adapter, it is preferred that at least the tool cavity end portion 16 as well as the adapter portion 34 or, at the very least, the cavities 22 and 36, be constructed of a somewhat resilient or flexible type material such as certain types of plastic or rubber materials which would yield to some extent and more securely hold and frictionally engage a clip/fastener member when such clip/fastener member is inserted within the respective cavities 22 and 36. It is also recognized that even certain metal type materials such as certain metal alloys or a fiberglass type material may likewise be utilized for the cavity construction so long as such materials are again resilient or flexible enough to allow for sufficient yielding of the cavity side walls to effect a secure and stable engagement with a clip/fastener member inserted therewithin. A wide variety of other acceptable materials could likewise be employed to fabricate the recessed cavities associated with the present invention. Still further, it is also important to note that the overall dimensions of the present tool 10 and the adapter/insert member 32 as well as the particular configuration of such members and the particular configuration of the cavities 22 and 36 are likewise subject to wide variations as previously explained. Although the present tool device 10 has particular utility for removing and attaching clip type fastener members, it can likewise be utilized in a multitude of different applications including removing and attaching a wide variety of different fastener members including non-clip type fasteners as well.

Thus, there has been shown and described a novel tool device for more easily and effectively attaching and removing clip type fastener members commonly used in association with trailer hitches and other devices, which tool device fulfills all of the objects and advantages sought therefor. Many changes, modifications, variations and other uses and applications of the present construction will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. A tool for attaching and removing various fastener members from a wide variety of different mechanical assemblies comprising a body portion having first and second end portions associated therewith, said body portion being sized and shaped so as to be comfortably grasped by a user's hand, the first end portion of said body portion including means for engaging the fastener member to effect removal thereof, said removal means enabling a pulling force to be exerted against the fastener member during the removal process, the second end portion of said body portion including means for holding the fastener member in an operatively stable position to effect attachment thereof, said attachment means enabling a pushing force to be exerted against the fastener member during the attachment process, and means for fastening the tool member to the particular mechanical assembly associated with the fastener member to be attached or removed therefrom.

2. The tool member defined in claim 1 wherein said body portion is contoured so as to be comfortably grasped by a user's hand regardless of which end of the tool body portion is being utilized.

3. The tool member defined in claim 1 wherein said recessed cavity is sized and shaped to accommodate clip type fastener members of varying sizes and shapes.

4. The tool member defined in claim 1 wherein at least a portion of the side walls of said recessed cavity are V-shaped in cross-section.

5. The tool member defined in claim 1 including an adapter member insertably receivable within the recessed cavity associated with one end portion of said body portion, said adapter member including a recessed cavity which is dimensioned to receive and hold similar clip type fastener members, the recessed cavity associated with said adapter member being sized and shaped to engage and hold a different range of differently sized clip type fastener members as compared to the recessed cavity associated with said tool body portion, said adapter cavity likewise enabling the clip type fastener member inserted therewithin to be securely held in an operative position for effecting attachment thereof to the particular mechanical assembly to which it is being attached.

6. The tool member defined in claim 5 including a plurality of said adapter members, each of said adapter members including a recessed cavity which is shaped and dimensioned to insertably receive and hold a different range of differently sized clip type fastener members.

7. The tool member defined in claim 5 wherein said adapter member includes means for engaging the recessed cavity associated with said tool body portion.

8. The tool member defined in claim 7 wherein said adapter means for engaging the recessed cavity associated with said tool body portion includes a tab member, said tab member being insertably engageable with the recessed cavity associated with said tool body portion.

9. The tool member defined in claim 1 wherein the opposite end portion of said body portion includes a plurality of recessed cavities which are dimensioned to receive and hold clip type fastener members of various sizes when inserted therewithin.

* * * * *

UNITED STATES PATENT AND TRADEMARK OFFICE

CERTIFICATE OF CORRECTION

PATENT NO. : 5,557,832

DATED : September 24, 1996

INVENTOR(S) : Gerald A. Vanden Brook

It is certified that error appears in the above-indentified patent and that said Letters Patent is hereby corrected as shown below:

Column 8, lines 7-22, delete claim 1 in its entirety and substitute therefor the following claim 1 :

--A tool member for attaching and removing clip type fastener members and the like from a wide variety of different mechanical assemblies comprising a body portion having opposed end portions, one end portion of said body portion including hook means for engaging the clip type fastener member in such a manner so as to exert a pulling force thereagainst to effect removal thereof from the particular mechanical assembly to which it is attached, the opposite end portion of said body portion including a recessed cavity which is dimensioned to receive and hold the clip type fastener member when inserted therewithin, said recessed cavity including side walls which frictionally engage and securely hold the clip type fastener member in an operative position for effecting attachment thereof to the particular mechanical assembly to which it is being attached, and an elongated slot positioned and located at an intermediate location between the opposed end portions of said body portion, said elongated slot being dimensioned so as to receive strap means which may be inserted therethrough.--

Signed and Sealed this

Seventh Day of January, 1997

*Attest:*

BRUCE LEHMAN

*Attesting Officer*

*Commissioner of Patents and Trademarks*